July 28, 1925.
S. VARNER
ROTARY OVEN TABLE
Filed Oct. 12, 1923
1,547,979
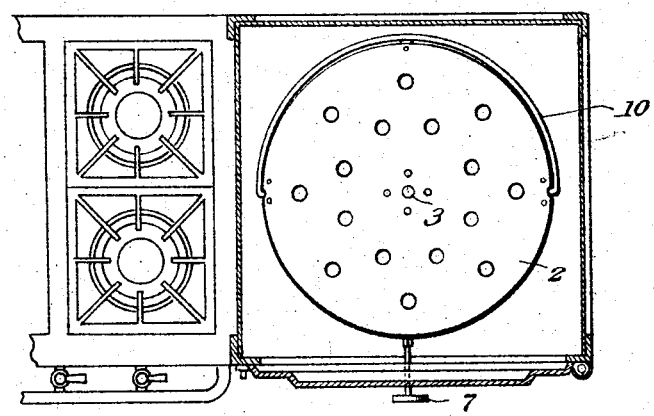
Fig. 1.
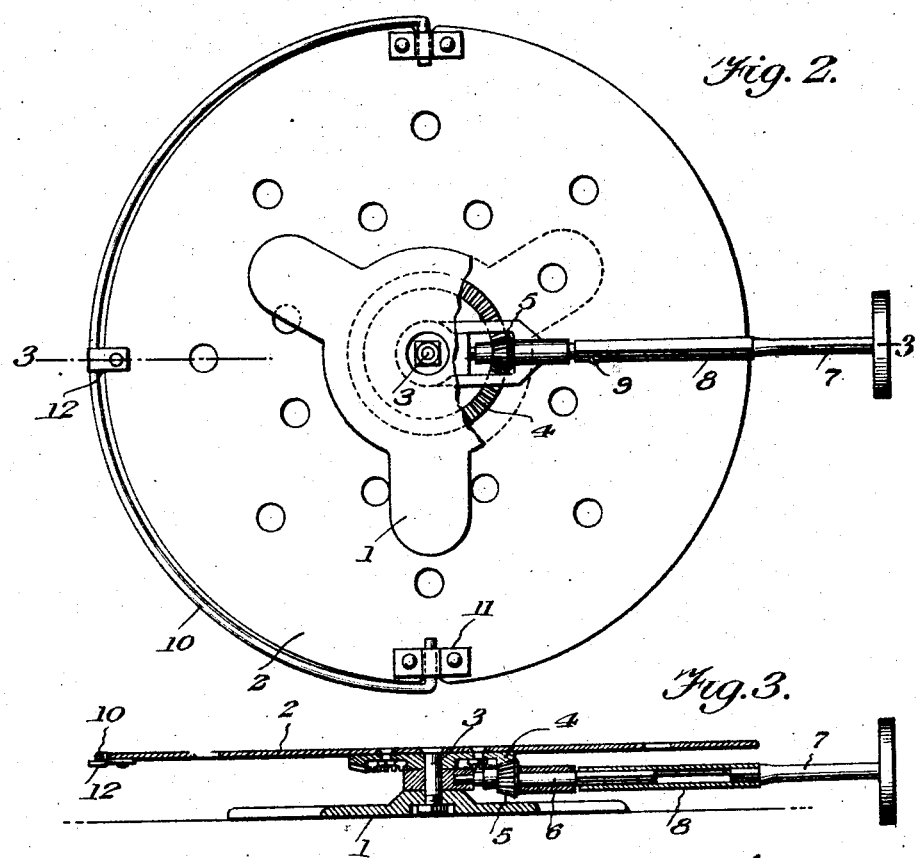
Fig. 2.
Fig. 3.
Sally Varner
INVENTOR Patented July 28, 1925.

1,547,979

UNITED STATES PATENT OFFICE.

SALLIE VARNER, OF ELTON, PENNSYLVANIA.

ROTARY OVEN TABLE.

Application filed October 12, 1923. Serial No. 668,165.

*To all whom it may concern:*

Be it known that I, SALLIE VARNER, a citizen of the United States, residing at Elton, in the county of Cambria and State of Pennsylvania, have invented new and useful Improvements in Rotary Oven Tables, of which the following is a specification.

This invention relates to an attachment for a stove, the general object of the invention being to provide a support for articles placed in the oven of the stove with means for moving the support to place the articles in different positions in the oven.

Another object of the invention is to make the parts of the device adjustable for different sizes of ovens.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through a stove showing the invention in use.

Figure 2 is an enlarged plan view of the device, with parts broken away.

Figure 3 is a section on line 3—3 of Figure 2.

As shown in these views, the device comprises a base 1, a plate 2 which is rotatably connected with the base by the bolt 3, and the means for rotating the plate which consists of the gear 4 attached to the plate, the beveled pinion 5 engaging the gear and which is carried by the stem 6 of the handle 7. The handle is made adjustable as to its length by having the tubular part 8 engaging a part of the stem to which it is attached by the set screw 9. This handle is connected with a washer 7' which is rotatably mounted on the bolt 3 so that the handle can be moved to a position where it is accessible from the oven door. A bail 10 is fastened to the plate by the clips 11 so that the entire device can be easily and quickly placed in an oven or removed therefrom, the bail normally resting upon the clip 12 when not in use.

From the foregoing it will be seen that by placing the device in an oven, as shown in Figure 1, articles to be baked can be placed on the plate and then by turning the handle the articles can be moved to the rear of the oven. This will facilitate the placing of the articles in the oven and their removal therefrom and it also insures an even baking of the articles by moving them about while in the oven.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An oven attachment comprising a base, a vertical shaft carried thereby, a table rotatably mounted on the shaft, a washer rotatably mounted on the shaft and arranged between the table and base, a handle connected with the washer, gears connecting the handle with the table so that the table can be rotated by the rotary movement of the handle and means for adjusting the handle as to its length.

In testimony whereof I affix my signature.

MRS. SALLIE VARNER.